Figure 1:
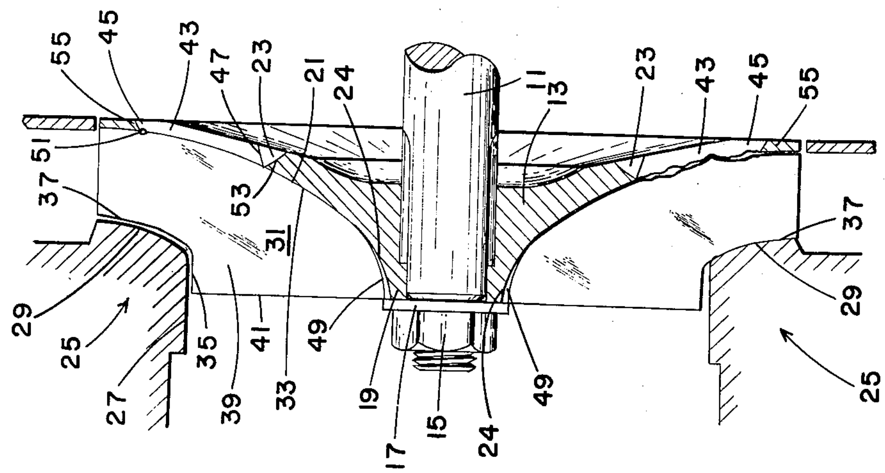

RADIAL-FLOW TURBINE SAFETY

Filed July 22, 1963

INVENTOR.
RUSSELL T. DE MUTH
DECEASED
BY ETHEL K. DE MUTH
EXECUTRIX
BY Robert W. Ely, ATTORNEY 3,164,370

RADIAL-FLOW TURBINE SAFETY

Russell T. De Muth, deceased, late of Marcy, N.Y., by Ethel K. De Muth, executrix, Marcy, N.Y., assignor to The Bendix Corporation, a corporation of Delaware
Filed July 22, 1963, Ser. No. 297,182
6 Claims. (Cl. 253—77)

This invention relates to turbines and more particularly concerns providing safety in radial-flow turbines.

An object of the present invention is to provide an improved radial-flow turbine which does not disintegrate in an uncontrolled manner upon the turbine wheel rotating at an excessive speed after a control failure.

A further object is the provision of an improved radial-flow turbine wheel which has releasable blades actuated by centrifugal force acting on a peripheral shear section at a speed less than runaway speed at which a turbine tends to disintegrate.

Another object is to provide an improved radial-flow turbine wheel comprised of a turbine disc having a hub and blades firmly attached to the disc by a severable peripheral connection and a hub connection whereby a blade is released at a predetermined speed.

An additional object is the provision of a radial-flow turbine comprised of a containment shroud and a turbine wheel which includes blades attached to a turbine disc at the periphery by a shear arrangement and at the disc hub by retention means whereby a blade is released at a predetermined speed and moves into the shroud to render the turbine inoperative.

Figure 4:
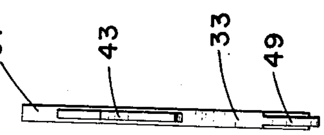
Figure 3:
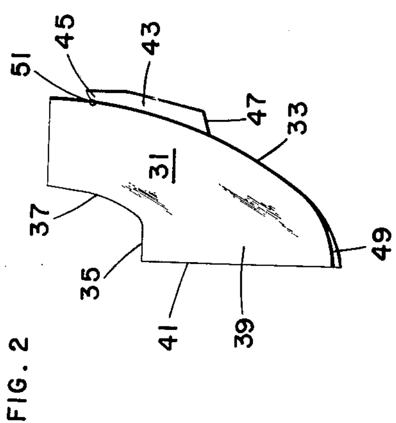
Figure 2:
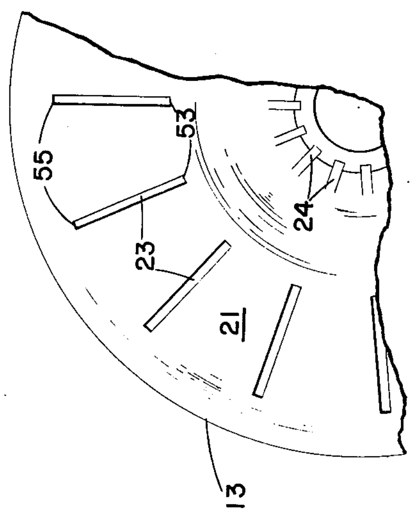

The realization of the above objects along with the features and advantages of the invention will be apparent from the following description and the drawing in which:

FIGURE 1 is a side cross-sectional view of a radial-flow turbine incorporating the invention and shows (in the upper half) the turbine arranged for normal operation and (in the lower half) the controlled-failure operation with a turbine blade released, FIGURE 2 is plane view of a segment of the upstream side of the turbine wheel disc and shows the plurality of openings for receiving pointed pivot tabs of the blades, FIGURE 3 is plane side view of a turbine blade and shows thin, axially-extending projections for use in retaining at the inner and outer parts the blades, and FIGURE 4 is plane end view of the blades (not shown bent) and shows the shear tab and the positioning projection near the upper and lower parts of the blade.

Referring to FIGURES 1–4 of the drawing, a turbine wheel shaft 11 extends through and is splined to a turbine wheel disc 13. A nut 15 is threaded on the end of shaft 11 and abuts and positions a washer 17 against the hub part 19 of the turbine wheel disc 13 and its blades. The disc 13 has a radially-outwardly-diverging surface 21 and a ring or plurality of equally-spaced openings 23 in the peripheral portion thereof and a ring of hub recesses 24 as shown in FIGURE 2. Housing or shroud 25 has a first part providing an annular axially-extending surface 27 and a second part providing an outwardly-diverging surface 29.

The radial-flow turbine blades 31 have an edge 33 fitted (see upper half of FIGURE 1) along the diverging surface 21 of the disc 13 and extend generally adjacent to the two surfaces 27 and 29 of the housing or shroud 25. Each blade 31 has at its periphery an axially-extending edge 35 and radially-outwardly-diverging edge 37. Edge 35 is part of the upstream portion 39 which has radially-extending upstream edge 41. The blades 31 also have axially-extending shear tabs or lugs 43 which include a pointed outer part 45 and a radially-outwardly-inclined inner edge 47. At the bottom of each blade 31, there is a positioning extension 49. At the juncture of blade disc edge 33 and the pointed part 45 of the shear tab 43, a hole 51 is drilled centered at the juncture to facilitate shearing of the shear tab 43 along its base. It is to be noted that the tab 43 has a significantly smaller lateral dimension or width than the blade 31 and that the minimum axial dimension of the tab 43 exceeds its width. Positioning extensions 49 and hub recesses 24 each having a decreasing radial dimension in a downstream direction and respectively merge into blade disc edge 33 and disc surface 21. Tabs 43 and extensions 49 respectively are closely-fitted in openings 23 and recesses 24 except that the base of tab end 47 only contacts the upstream edge 53 of opening 23 to provide for insertion and a reaction location. The notch formed by the disc edge 33 of the blade 31 and the pointed part 45 of tab 43 mates against the pointed outer lateral edge 55 of opening 23.

In FIGURE 1 (upper half), it can be seen how the blades 31 are fitted into and on the turbine wheel disc 13 by having shear extensions or tabs 43 extending or hooked into the disc openings 23 and with blade edges 33 extending along surface 21 of the turbine wheel disc 13 and the positioning extensions 49 fitted into hub recesses 24. It is to be noted that the notch formed by the disc edge of the blade and the pointed part 45 of tab 43 fits against the pointed outer lateral edge 55 of opening 23. The blades 31 are locked in position by means of lock ring 17 and being received in slots 23 provide restraint to radially-outward movement until a predetermined speed causes the blades 31 having the necessary center of gravity to rupture or shear tab 43 with pivoting at the fulcrum point at the radially-inner part of the blade at ring 17. Lock ring 17 is positioned by nut 15, as previously described. It is to be noted that, after a blade 31 has been released and pivots with outward movement, that edge 37 will drag on wall 37 of shroud 25.

The operation of the controlled-failure, radial-flow turbine of the present invention can be understood by reference to the upper and lower halves of FIGURE 1.

The normal positioning is shown in the upper half of FIGURE 1 and shows the blade retention when the turbine is operating below a predetermined speed without a condition approaching disintegration of the turbine wheel. The cooperation at tabs 43 and inclined or pointed edges 55, at disc surface 21 and blade disc edges 33, and at washer 17 and blade extension 49 in hub recess 24 gives a sturdy turbine wheel reliably operable at normal speeds.

Assuming the turbine wheel approaches the predetermined speed (well below disintegrating speed) due to a control failure, the centrifugal force developed by the blade 31 (considered as a free body) during rotation will act through the mass center of the blade (center of gravity). The centrifugal force acting through the center of gravity of the blade is resisted at lateral edge 55 of opening 23 against which the pointed part 45 of shear extension 43 bears and any turning moment is resisted at washer 17. The cross-sections of blade tabs 43 are designed to resist a predetermined force and will shear or fail when a predetermined speed generates the excessive force.

Upon failure of a shear tab or extension 43 at the predetermined speed, the blade 31 will then rotate slightly outwardly about the hub pivot point at washer 17 until it contacts surface 29 of the containment shroud 25 which is designed to resist the loading from the released blades 31. The rubbing of a released blade 31 dissipates energy with its radial edge 37 dragging on shroud surface 29. The first-released blade 31 is pulled from the disc 13 by the drag and the rotation of the turbine wheel.

The released blade (relatively not rotating and in some instances, jammed) collides with the other blades causing them to be pulled from the wheel and jammed, thereby further slowing down the turbine due to ineffective gas flow and frictional drag. This action constitutes a controlled failure at a predetermined speed with turbine operation interference and energy dissipation before any dangerous speed is reached which previously occurred at a high energy level causing turbine wheel disintegration.

It is to be understood that persons skilled in the art can make changes in the disclosed device without departing from the invention as set forth in the appended claims.

What is claimed is:

1. A radial-flow turbine wheel adapted to provide a controlled failure at a predetermined speed comprised of:
- a turbine wheel disc having a hub, an outwardly-diverging surface and radial openings extending radially-inwardly from the peripheral part of the disc,
- radial-flow turbine blades having disc edges extending along said disc surface and having shear extensions inserted in said disc radial openings for holding said blades,
- restraining means at said hub contacting said blades arranged to prevent lateral movement of said blades and axial movement of said blades away from said disc, and
- said shear extensions being constructed and arranged to separate from the remainder of said blades by shearing at a predetermined speed of said turbine wheel, whereby said blade will pivot about said restraining means at said hub away from the outer part of said disc.

2. The turbine wheel according to claim 1 and being further characterized by:
- said disc radial openings having an outer pointed edge at said diverging surface, and
- said extension having an outer pointed edge hooked under the pointed edge of said disc's opening and said extension being formed with a reduced section at junction of the base of said pointed edge with said disc edge.

3. The turbine wheel according to claim 1 and being further characterized by:
- said turbine blades having positioning projections at the inner part of their disc edges,
- said turbine wheel disc having recesses receiving and mating with said positioning projections, and
- said restraining means including a turbine shaft extending through and splined to said disc and radially-extending structure abutting the inlet edges of said blades.

4. A radial-flow turbine adapted to provide a controlled failure at a predetermined speed comprised of:
- a turbine wheel disc having a hub, an outwardly-diverging surface and radial openings extending radially-inwardly from the peripheral part of the disc,
- radial-flow turbine blades having disc edges extending along said disc surface and having shear extensions inserted in said disc radial openings for holding said blades,
- said blades having radial inlet edges, axial outer edges, diverging edges and axial outlet edges,
- restraining means at said hub contacting said blades arranged to prevent lateral movement of said blades and axial movement of said blades away from said disc,
- said retention extensions being constructed and arranged to separate from the remainder of said blades by shearing at a predetermined speed of said turbine wheel, whereby said blade will pivot about said restraining means at said hub away from the outer part of said disc,
- said disc radial openings having an outer pointed edge at said diverging surface, and
- said extension having an outer pointed edge hooked under the pointed edge of said disc's opening and said extension being formed with a reduced section at the junction of the base of said pointed edge with said disc edge.

5. The turbine according to claim 4 and being further characterized by:
- a heavy containment shroud facing the axial and diverging edges of said blades whereby, when a blade is released at a predetermined speed by shearing its retention extension inwardly from its pointed edge, said blade will have its diverging edge contact said containment shroud due to the pivoting action.

6. A radial-flow turbine adapted to brake itself or to provide containment and to prevent disintegration above a predetermined speed comprised of:
- housing means including an outer containment shroud and an inner member arranged to provide an annular outlet for turbine gases,
- said shroud having a radially-outwardly diverging surface from said inlet,
- a radial-flow turbine wheel having a disc with a hub part and a plurality of radially-extending blades,
- said blades having a radially-extending inlet edge and an axial-extending outlet edge,
- said turbine disc having an annular radially-outwardly diverging surface extending from the hub part of said disc to the periphery of the disc to provide a curved surface between the inlet and outlet edges of said blades,
- each of said blades having a disc edge adjacent said curved flow surface of said disc and a shroud edge adjacent said shroud,
- said disc hub part having a plurality of grooves therein which gradually decrease in depth radially outwardly,
- the peripheral part of said disc having a plurality of slots therethrough which have an outer lock surface inclined radially outward from said curved disc surface,
- the radial-inner part of said blade disc edge having a projection received in said hub groove with a slight clearance at the inlet part of said groove,
- the radially-outer part of said blade disc edge having a lock extension received in said disc slot,
- said lock extension having an inclined end abutting the outer inclined end surface of said disc slot, and
- said lock extension having a reduced area failure section at the juncture thereof with said blade, whereby each of said blades will pivot against said shroud when, at above a predetermined turbine speed, said lock extension will be sheared from said blade beginning at said failure section.

References Cited in the file of this patent

UNITED STATES PATENTS

| | | |
|---|---|---|
| 2,935,294 | Angell et al. | May 2, 1960 |
| 2,976,012 | Allen | Mar. 21, 1961 |
| 3,003,745 | Ferguson et al. | Oct. 10, 1961 |